US006119793A

United States Patent [19]
Siegenthaler

[11] Patent Number: 6,119,793
[45] Date of Patent: Sep. 19, 2000

[54] ROCK DRILL

[75] Inventor: Max Siegenthaler, Neuhausen am Rheinfall, Switzerland

[73] Assignee: SIG Rocktools AG, Switzerland

[21] Appl. No.: 09/165,862

[22] Filed: Oct. 2, 1998

[30] Foreign Application Priority Data

Oct. 3, 1997 [EP] European Pat. Off. .............. 97810731

[51] Int. Cl.[7] .............................. B23Q 5/00

[52] U.S. Cl. .............................. 173/11; 173/2; 173/8; 173/105; 173/106

[58] Field of Search .............................. 173/11, 4, 5, 7, 173/8, 9, 177, 2, 105, 106, 206; 175/27

[56] References Cited

U.S. PATENT DOCUMENTS

| | | | |
|---|---|---|---|
| 3,822,752 | 7/1974 | Montabert | 173/177 |
| 4,006,783 | 2/1977 | Granholm | 173/177 |
| 4,023,626 | 5/1977 | Salmi et al. | 173/8 |
| 4,064,950 | 12/1977 | Salmi et al. | 173/8 |
| 4,157,736 | 6/1979 | Carbert | 173/11 |
| 4,356,871 | 11/1982 | Fujikawa | 173/11 |
| 4,369,848 | 1/1983 | Salmi et al. | 173/8 |
| 4,711,090 | 12/1987 | Hartiala et al. | 173/8 |
| 5,064,003 | 11/1991 | Neroznikov et al. | 173/106 |
| 5,117,921 | 6/1992 | Bartels et al. | 173/105 |
| 5,121,802 | 6/1992 | Rajala et al. | 173/11 |
| 5,415,240 | 5/1995 | Mundjar | 173/105 |
| 5,778,990 | 7/1998 | Niemi | 173/11 |

FOREIGN PATENT DOCUMENTS

| | | |
|---|---|---|
| 145701 | 6/1985 | European Pat. Off. . |
| 472982 | 3/1992 | European Pat. Off. . |
| 2630495 | 10/1989 | France . |
| 4328278 | 3/1994 | Germany . |

*Primary Examiner*—Peter Vo
*Assistant Examiner*—Jim Calve
*Attorney, Agent, or Firm*—Webb Ziesenheim Logsdon Orkin & Hanson, P.C.

[57] ABSTRACT

The rock drill (9) includes a reversible rotary motor (10) and a percussion unit (11) with a percussion valve (17). Rotary unit and Percussion unit (11) are operated via separate valves (39, 46) in a control unit (34). The percussion frequency of the percussion unit (11) is coupled to the rotation rate of the rotary motor (10) in such a way that the percussion unit (11) stops automatically when the rotary motor (10) comes to a standstill. The coupling is achieved by employing a fluid driven assembly without a mechanical clutch between the rotary motor (10) and the percussion valve (17). When disassembling the drill rods a jammed thread can be shaken loose with the percussion unit (11) be manually bypassing the fluid coupling. The same is also possible in case the drill rods becomes jammed in the drill bore. With the described embodiment a simple, space-saving and cost-effective construction is achieved which is versatile in application.

14 Claims, 3 Drawing Sheets

ROCK DRILL

BACKGROUND OF THE INVENTION

This invention relates to a rock drill having a rotary motor and a percussion unit. Such a rock drill is known from U.S. Pat. No. 5,415,240. The rotation gear of said drill is driven by a rotary motor. The percussion unit is controlled by a rotary valve which is driven via a gear link by the rotary motor. This has the advantage that the percussion frequency is proportional to the rotation rate of the rotary motor and that the percussion unit stops automatically in case the drill steel gets jammed. This saves a substantial amount of time and drilling equipment. The rock drill has therefore very much proved itself. Unfortunately it is quite complex in construction.

In EP-A-145 701 a further rock drill is described in which a pilot operated valve is arranged in the supply line to the percussion motor. The supply pressure to the rotary motor acts as a pilot pressure for the valve. When the drill steel gets stuck in the hole, the turning rate of the rotary motor is reduced and therefore the supply pressure to the motor increases so that the valve closes the supply to the percussion motor. This solution requires a predetermined supply pressure to the rotary motor. Therefore, this pressure cannot be adapted to different rock formations. This rock drill therefore is relatively inflexible in its application.

SUMMARY OF THE INVENTION

The object of the present invention is to develop a rock drill in such a way that its construction is simpler than that of the rock drill according to U.S. Pat. No. 5,415,240 under retention of its advantages and that it is flexible in its application. This object is achieved by the rock drill in accordance with the present invention which comprises a rotary motor and a percussion unit with a percussion valve. The rotary valve is pressurisable via a first valve by a fluid supplied to a control unit. The percussion unit is pressurisable via a second valve. A throttle is arranged in a return line of the rotary motor. The pressure upstream of this throttle is used to control the percussion unit such that percussion stops when the rotary motor is arrested.

BRIEF DESCRIPTION OF THE DRAWINGS

Embodiments of the present invention will now be described with reference to the drawings, in which.

DESCRIPTION OF THE PREFERRED EMBODIMENTS

Figure 1:
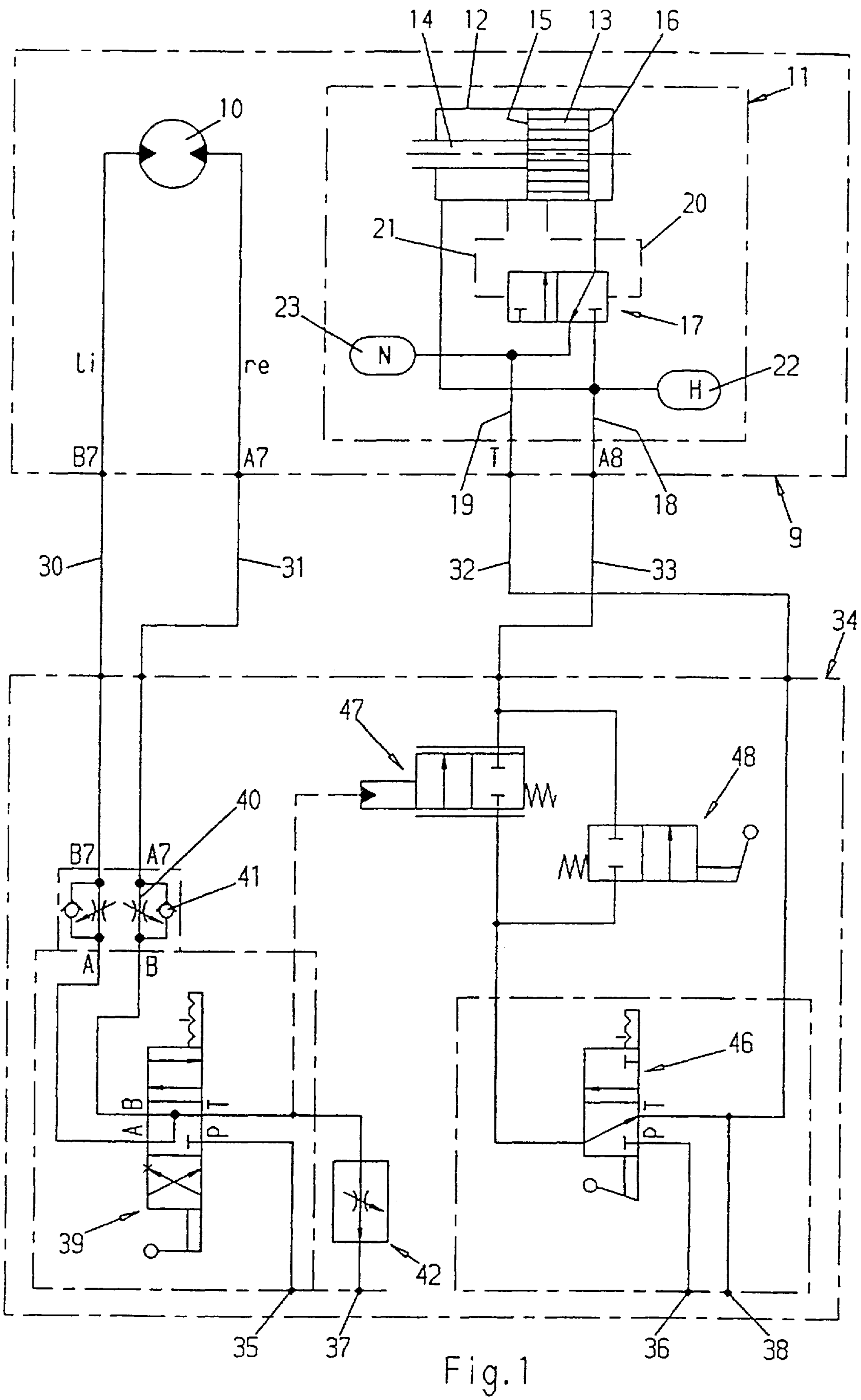
FIG. 1 shows a hydraulic scheme of a first embodiment, of the invention

FIG. 1 shows a hydraulic scheme for a rock drill 9. The rock drill comprises a housing (not shown), in which an adapter is supported in such a way that it is reciprocable and rotatable. On its forward end the adapter may have (for example) a male thread for connection to the drill steel. The adapter is coupled via a gear link to a rotary motor 10. So far, the rock drill corresponds to the disclosure according to FIG. 1 of U.S. Pat. No. 5,415,240, which is herein incorporated by reference.

Coaxial to the adapter a percussion unit 11 is arranged with a piston 13, that slides in a cylinder 12, and a piston rod 14. In operation the front face of the rod 14 strikes the rear end of the adapter. The piston face 15 facing the rod is constantly pressurised by the supply pressure. The opposed surface 16 is, via a percussion valve 17, alternatingly connected to the supply pressure from the supply line 18 and to the return pressure in the return line 19. Via pilot lines 20, 21, that open into the cylinder bore adjacent to one final position of the piston 13, the percussion valve spool of the valve 17 is reciprotatingly driven into the two switch positions. An accumulator 22, 23 is individually connected to each of the supply line 18 and the return line 19. These render a high capacity of the percussion unit 11 possible.

The rock drill 9 is linked via four pressure lines 30 to 33 to a control unit 34. The control unit has separate connections 35, 36 for the adjustable supply pressure to the rotary motor 10 and to the percussion unit 11. The return from the rotary unit and percussion unit may have either one common, or two separate connections 37, 38.

The rotary motor 10 is controlled by a three-position-four-way valve 39, such that the motor 10 can rotate in both directions. One direction of rotation serves to drill, the other to unscrew the drill rods. In a majority of countries the direction of drilling is counterclockwise, such that when drilling the line 30 is pressurised. In each of the lines 30, 31 there is an adjustable throttle 40 built in as well as a check valve 41, which is switched parallel to it and opens in direction of the return. With the throttles 40 the rate of flow is separately adjustable for both direction of rotation. In the return of the valve 39 to the connection 37 a further adjustable throttle 42 is fitted.

The supply pressure to the percussion unit 11 is controlled by a manually controlled, two-position valve 46. Switched in series with valve 46, there is a two-way, pilot controlled valve 47 as well as parallel to that, a manually controlled two-way valve 48. The valve 47 can either be a switch-valve (open-closed-valve) or, as shown, a proportional valve. The pilot pressure to the valve 47 is the return pressure of the rotary unit inbetween the valve 39 and the throttle 42

In operation, the described rock drill 9 works as follows: In normal operation the valve member of the valve 39 is in the lower position, such that the supply pressure is supplied to the throttle 40 in line 30 and that line 31 is connected to the return 37. The valve 46 is switched on. With a running motor 10 a pressure head is created upstream of the throttle 42, such that the valve 47 too is switched on and the percussion unit 11 is running. Should the drilling gear now become jammed in the rock, the motor 10 and the return flow through line 31 stops. With this the pilot pressure to valve 47 will decrease immediately, such that it switches off and the percussion unit 11 stops. To retract the drill rods, the rock drill is retracted on its limber. Valve 39 is switched off. If necessary the percussion unit can be switched on by switching on valve 48, so that the hammer vibrates even though the motor 10 is standing still. If the drill gear, which often comprise several threaded rods screwed together, is to be dismounted, firstly the last drill rod is retracted from the drill bore and the drill rod clamped at the sleeve to the second but last drill rod with a clamping device. Now the valve 39 is switched to its upper position, such that at the adapter a torque in a loosening direction is created. Should the screw-coupling be jammed, the percussion unit 11 may be switched on by switching on valves 46,48, such that the screw-coupling can be rattled loose.

The described hammer is versatile in its applications because the percussion unit 11 and the rotary gear can be driven independently from each other and the percussion unit 11 nevertheless stops immediately if the rotary unit does not rotate. Therefore the arduous, and sometimes impossible task of retracting jammed drill rods can be avoided. The throttle 42 can be adjusted in such a way that valve 47 switches off before the motor 10 comes to a total standstill. This is an advantage, through which a jamming of the drill rods can be avoided with even more certainty. If valve 47 is designed as proportional valve it can further be achieved that the percussion frequency increases with an increasing rotation rate of the motor 10. The ratio between rotation rate and percussion frequency may be adjusted with throttle 42 which is an advantage for several kinds of rock. The rock drill according to the invention is designed much simpler than the one described in U.S. Pat. No. 5,415,240. Therefore its dimensions are smaller, which is an advantage especially in confined spaces in tunnels or on superstructures of excavating machines. The percussion valve 17 can for example be mounted sideways such that the rock drill 9 can be mounted closer to the limber. Through this, the moments created when advancing the drill, diminish. Since the hydraulic interconnection between rotary motion and percussion is derived from the return from the rotary unit, it is independent from the supply pressure to the rotary motor. Through this the rock drill a is very versatile in application, especially for drilling in different rock conditions because the supply pressure can be optimally adjusted to the rock composition to be drilled into. The system can be operated either hydraulically or pneumatically. The actuation of the valves, especially of those outside the rock drill 9, can be carried out alternatively to the way shown, either hydraulically, pneumatically, electrically or manually.

In the following embodiment like parts are designated with like reference numerals so that the detailed description of those parts need not to be repeated.

Figure 2:
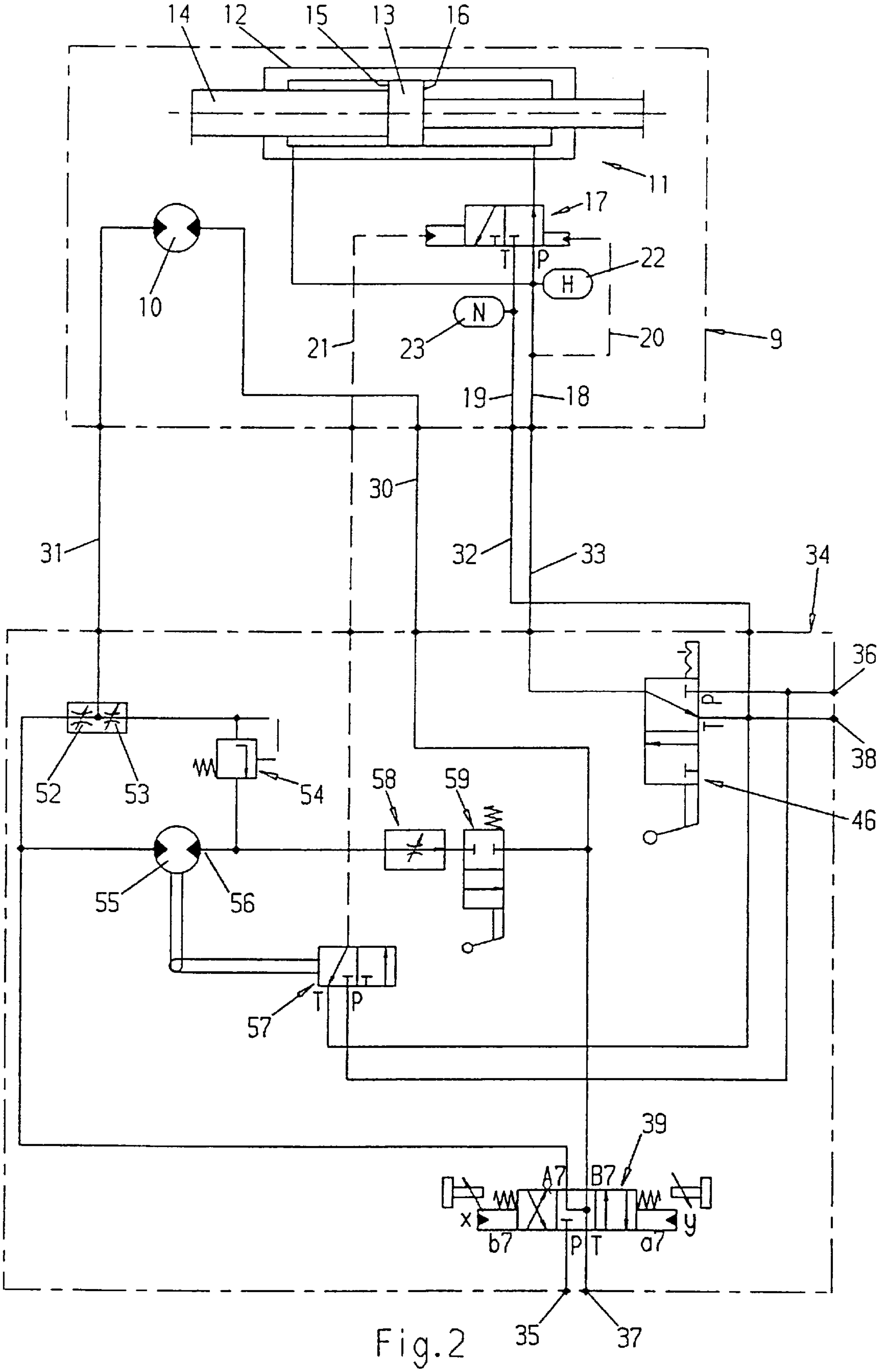
FIGS. 2 and 3 show two further embodiments of the invention

In the embodiment shown in FIG. 2 two adjustable throttles 52, 53 are connected to line 31 which serves as return line. The throttle 52 is linked to the connection A7 of valve 39 which, when drilling, is connected to return line connection 37. The other throttle 53 is, via an adjustable pressure reducing valve 54, linked to the connection 56 of a volumetric cadence motor 55, the other connection of which too, is linked to connection A7. The cadence motor 55 drives a three-way cadence valve 57, which is linked to connections 36, 38 for the percussion unit 11. The outlet of valve 57 is linked to pilot line 21.

When drilling, the return flow in line 31 is divided by throttles 52, 53 into two branch flows, from which one drives motor 55. Thereby the valve 57 switches back and forth with a frequency proportional to the rotation rate of motor 10. The ratio of the revolution rate to the percussion frequency is adjustable with the throttles 52, 53. If the rate of rotation drops heavily, the pressure drops upstream of throttles 52, 53, and therefore also downstream of throttle 53. With a minimal revolution rate which is adjustable at valve 54 the valve 54 closes, such that motor 55 stops and the percussion unit stands still, before motor 10 comes to a total standstill. Thereby a jamming of the drill bit or the drill rods can be avoided in most cases.

To be able to operate the percussion unit 11 when rotating clockwise, meaning when unjamming the thread of the drill rods, thus when there is a pressure head of the supply pressure at connection A7 of valve 39, connection 56 of motor 55 is additionally linked via a throttle 58 and a manual valve 59 to line 30. Thus when there is a torque acting in a loosening direction on the rotary motor 10, without it turning, meaning with jammed thread, the thread may be rattled loose by manually engaging percussion unit 11. In case a drill steel gets jammed in spite of the automatic shut down of the percussion unit 11, the rock drill 9 is retracted by means of its advance motor. When manually switching on percussion unit 11 by means of valve 59 the piston rod 14 does not anymore hit the adapter, but hits the piston face 15 against an oil cushion at the cylinder base and rattles loose the jammed boring gear via the rock drill housing. The throttles 52, 53 can also be laid out as one single distribution valve, for example a proportional, three-way valve. If the rock drill is to be used for drilling in the clockwise sense, which is the case e.g. in Australia, the connections to the rotary motor 10 are reversed.

Figure 3:
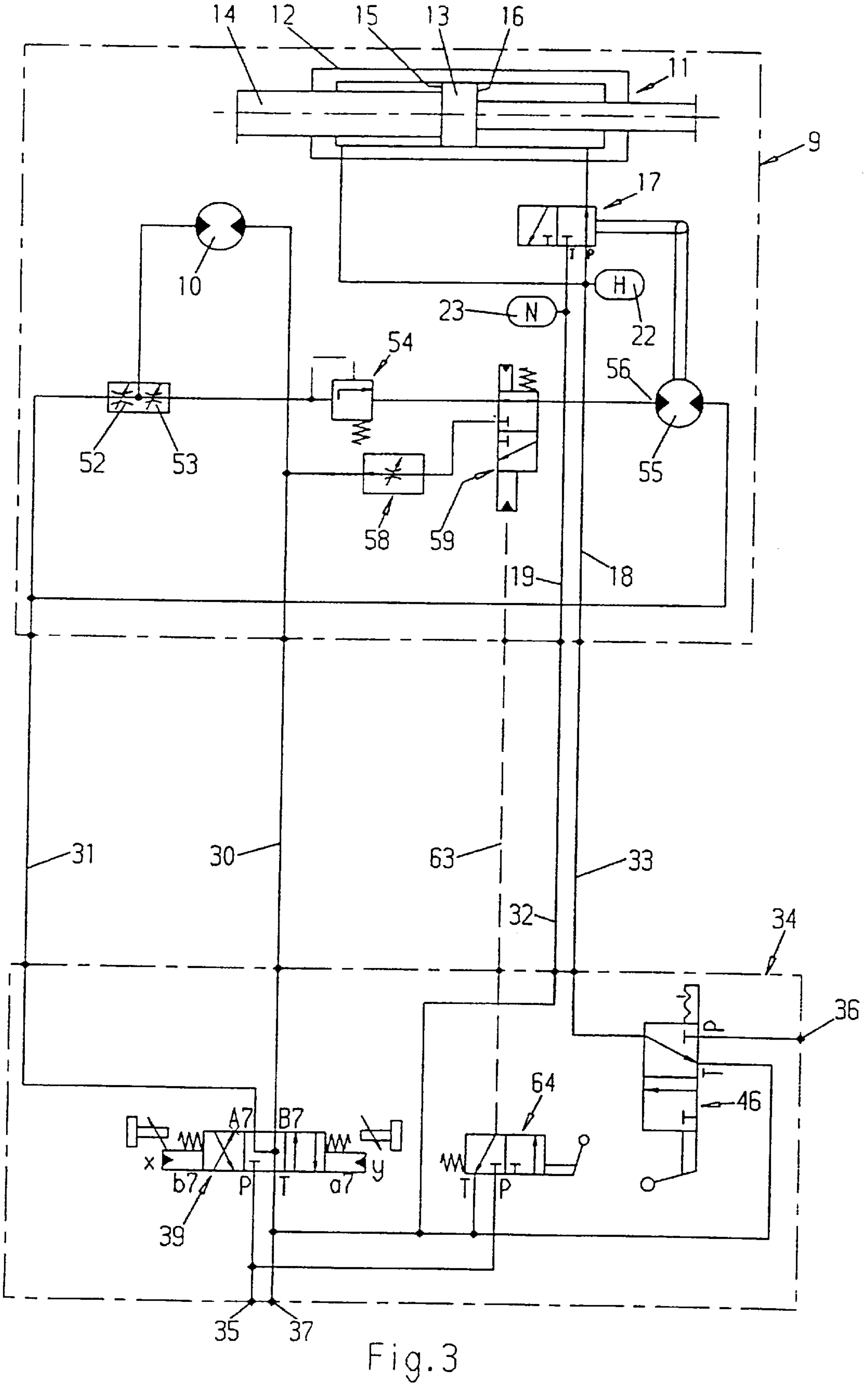

The embodiment according to FIG. 3 has a similar layout as the one according to FIG.2. In contrast to which the elements 52 to 56 and 58, 59 are built into the rock drill 9. The valve 59 is not manually operated but pilot-controlled by a manual valve 64 via a pilot line 63. The cadence motor 55 directly drives the percussion valve 17. It is therefore in this case a percussion valve motor. The mode of operation is analogue to the embodiment according to FIG. 2.

What is claimed is:

1. A rock drill, comprising:

a rotary motor; and a percussion unit with a percussion value, a control unit for said rotary motor, and said percussion unit, said control unit including a first value, a second valve and a supply connection for a fluid, wherein said rotary motor is pressurisable by the fluid via said first valve and said percussion valve is pressurisable by the fluid via said second valve, a stopping means for automatically stopping said percussion valve when said rotary motor is stopped, said stopping means comprising a throttle built into a return line of said rotary motor, and control means operated by a pressure fluid in a pressure line upstream of said throttle and controlling a flow of the fluid to said percussion valve.

2.The rock drill according to claim 1, wherein said throttle is adjustable.

3. The rock drill according to claim 1, wherein said throttle is built into a return line of said first valve, and wherein a pressure upstream of said throttle is a pilot pressure of a pilot-controlled third valve which is arranged in one of two lines connected to said percussion valve to close this line when the pressure upstream of said throttle is less than a pre-set value.

4. The rock drill according to claim 3, wherein said pilot-controlled third valve is a proportional valve, wherein a valve opening of said pilot-controlled third valve is proportional to the pressure upstream of said throttle.

5. The rock drill according to claim 3, wherein in lines to said rotary motor there is arranged a further throttle which is arranged parallel to check valve that opens in a direction of the return flow.

6. The rock drill according to claim 3, wherein parallel to said pilot-controlled third valve there is arranged a manually operated fourth valve.

7. The rock drill according to claim 1, wherein at least a partial flow in one of the fluid lines to said rotary motor is guided via a cadence motor which controls the percussion valve.

8. The rock drill according to claim 7, wherein in a line to said cadence motor a pressure reducing valve is arranged, such that said cadence motor stops before the rotary motor.

9. The rock drill according to claim 7, wherein the cadence motor is additionally pressurisable by a controllable third valve.

10. The rock drill according to claim 7, wherein said cadence motor operates a cadence valve which controls the percussion valve.

11. The rock drill according to claim 7, wherein said cadence motor directly drives the percussion valve.

12. The rock drill according to claim 1, wherein said first valve is a three-position four-way valve.

13. The rock drill according to claim 1, wherein an accumulator each is connected to a supply line to and to a return from said percussion valve.

14. The rock drill according to claim 1, wherein said second valve is a two-position three-way valve.

* * * * *

UNITED STATES PATENT AND TRADEMARK OFFICE

CERTIFICATE OF CORRECTION

PATENT NO. : 6,119,793

DATED : September 19, 2000

INVENTOR(S) : Max Siegenthaler

It is certified that error appears in the above-identified patent and that said Letters Patent is hereby corrected as shown below:

Column 1 Line 47 after "embodiment" delete comma (,).

Column 1 Line 48 after "invention" insert comma (,).

Column 1 Line 50 after "invention" insert period (.).

Column 2 Line 26 "both direction" should read --both directions--.

Column 4 Line 23, Claim 1, "percussion value" should read --percussion valve--.

Column 4 Line 25, Claim 1, "a first value" should read --a first valve--.

Column 4 Line 53, Claim 5, after "parallel to" insert --a--.

Signed and Sealed this

Fifteenth Day of May, 2001

*Attest:*

Nicholas P. Godici

NICHOLAS P. GODICI

*Attesting Officer* *Acting Director of the United States Patent and Trademark Office*